Aug. 20, 1940.                D. W. SHERMAN                2,212,354
                          BRAKE PEDAL CONSTRUCTION
                              Filed May 1, 1939
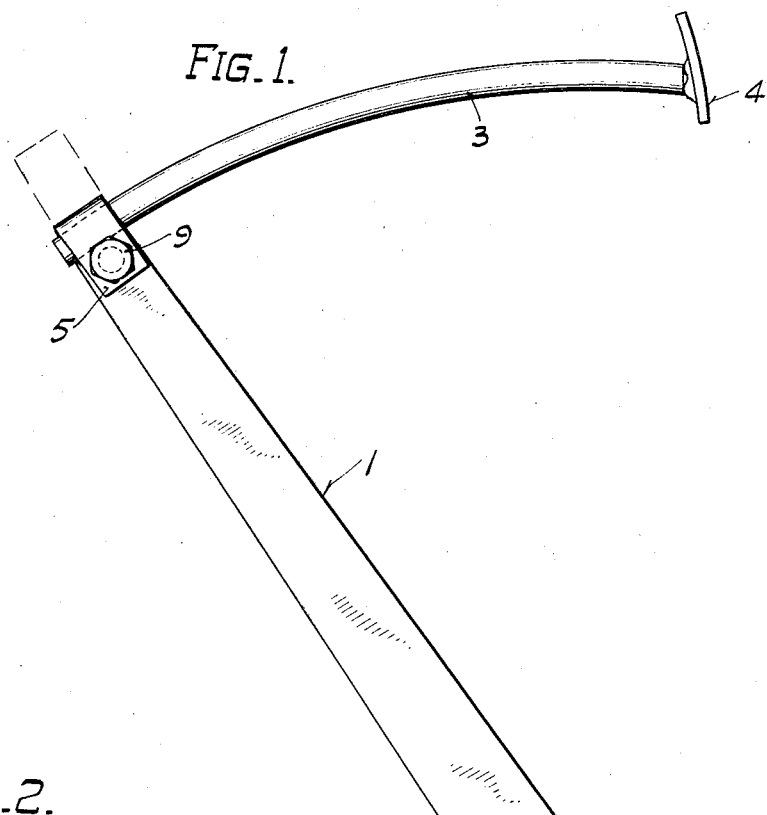
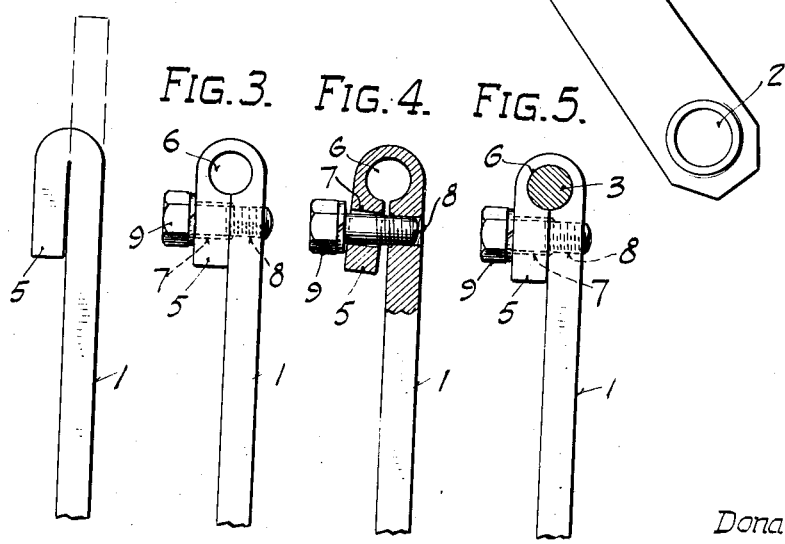
Donald W. Sherman
INVENTOR.
BY *[signature]*
ATTORNEY.

Patented Aug. 20, 1940

2,212,354

UNITED STATES PATENT OFFICE 2,212,354

BRAKE PEDAL CONSTRUCTION

Donald W. Sherman, Shorewood, Wis., assignor to A. O. Smith Corporation, Milwaukee, Wis., a corporation of New York Application May 1, 1939, Serial No. 271,098

3 Claims. (Cl. 74—560)

This invention relates to a brake pedal construction.

Heretofore, most of the pedal arms of brake pedals employed on automobiles have been made of single piece construction. In most of these the upper portion of the arm which extends through the floor board is of irregular shape and makes it difficult to provide packing around the pedal at the opening in the floor board.

It has been proposed to make such arms of two pieces and to have the upper section formed of round rod curved on a radius from the pivot point of the arm and presenting a smooth section for packing purposes. However, with such proposal it has been difficult to provide a fastening of the two sections of the arm together that would not cost too much, and at the same time that would be sufficiently strong and reliable.

The principal objects of the present invention are to provide a simple and less costly joint between the two sections of the arm and to provide a strong durable arm.

Other objects will appear hereinafter in connection with the description and illustration of an embodiment of the invention.

In the drawing:

Figure 1 is a side elevation of the pedal arm;

Fig. 2 is a front elevation showing the first bending operation applied to the blank in making the arm;

Fig. 3 is a view similar to Fig. 2 showing drilling of the clamp hole and the insertion of the bolt for tightening the clamp;

Fig. 4 is a similar view partly in section showing spreading of the clamp to receive the pedal rod; and Fig. 5 is a similar view showing the pedal rod in section and the clamp in final engagement with the rod.

The pedal arm comprises the upright arm 1 formed from plate metal stock with an embossed opening 2 for receiving a pivotal support at its lower end, and a round rod 3 secured to its upper end and supporting a pedal 4 at its outer end. The rod 3 is curved on a radius from the center of the opening 2.

The rod 3 is clamped in the end of the arm 1 as follows: The upper end 5 of arm 1 is first bent back upon itself as illustrated in Fig. 2. Then a hole 6 is drilled through the end from edge to edge and leaving a uniform thickness of metal on the upper side of the hole. The hole 6 is drilled with a smaller diameter than the diameter of rod 3, the drilling operation being carried out with the parts 1 and 5 being held tightly together either by the bolt 9, hereinafter referred to or by a suitable clamp.

A lateral hole 7 is provided in the end 5 of the arm and a corresponding threaded hole 8 is provided in the arm 1 in alignment with hole 7. A bolt 9 is extended through the hole 7 and into the threaded hole 8 to secure the two parts together.

Then the bolt 9 or clamping means is released and the parts are spread as shown in Fig. 4. The end of rod 3 is then forced through the hole 6 as illustrated in Figs. 1 and 5, and the bolt 9 is tightened to securely clamp the rod in place.

It has been found that this type of clamp is not only simple to make but it is much stronger than necessary. The ordinary test requirement for pedals is that they withstand a force of six hundred pounds applied to the pedal. A recent test showed that in a construction made in accordance with the present invention a pressure of over two tons was necessary to cause slipping of the clamp.

The clamp is efficient in that its walls are comparatively thin and of uniform curvature. The grip on rod 3 is like a wrapping force as distinguished from mere lateral pressure.

Various embodiments of the invention may be provided within the scope of the objects and claims.

The invention is claimed as follows:

1. In a pedal for automobiles, the combination of a pedal arm comprising a plate metal upright section having at the lower end thereof an opening extending through both faces thereof to receive a pivotal support and having its upper end bent back upon itself in a plane substantially normal to the faces of said plate metal section, said bent back upper end and the portion of the plate metal section adjacent thereto having an opening therebetween, said last-named opening extending from edge to edge of the plate metal section and being adapted to receive a pedal rod, said plate metal section having a relatively thin section at the fold.

2. In a pedal for automobiles, the combination of a pedal arm comprising a plate metal upright section having at the lower end thereof an opening extending through both faces thereof to receive a pivotal support and having its upper end bent back upon itself in a plane substantially normal to the faces of said plate metal section, said bent back upper end and the portion of the plate metal section adjacent thereto having a rod receiving opening therebetween, said last-named opening extending from edge to edge of said plate metal section and providing a relatively thin section at the fold, a rod having its inner end arranged in said rod receiving opening and clamped between said bent back upper end and said adjacent portion, and a pedal supported by the outer end of said rod.

3. In a pedal for automobiles, the combination of a pedal arm comprising a plate metal upright section having at the lower end thereof an opening extending through both faces thereof to receive a pivotal support and having its upper end bent back upon itself in a plane substantially normal to the faces of said plate metal section, said bent back upper end and the portion of the plate metal section adjacent thereto having a rod receiving opening therebetween, said last-named opening extending from edge to edge of said plate metal section and providing a relatively thin section at the fold, a rod having its inner end arranged in said rod receiving opening, and a screw securing said bent back upper end to said adjacent portion to clamp said rod against endwise movement through said rod receiving opening, whereby in pedal operation said rod exerts an edgewise thrust on said plate metal section.

DONALD W. SHERMAN.